United States Patent
Redin

(10) Patent No.: US 12,227,940 B2
(45) Date of Patent: Feb. 18, 2025

(54) FIRE RETARDANT BOARD

(71) Applicant: RE-BOARD TECHNOLOGY AB, Norrköping (SE)

(72) Inventor: Erik Gustaf Redin, Lidingö (SE)

(73) Assignee: RE-BOARD TECHNOLOGY AB, Norrköping (SE)

( * ) Notice: Subject to any disclaimer, the term of this patent is extended or adjusted under 35 U.S.C. 154(b) by 231 days.

(21) Appl. No.: 17/605,517

(22) PCT Filed: Apr. 23, 2020

(86) PCT No.: PCT/EP2020/061339
§ 371 (c)(1),
(2) Date: Oct. 21, 2021

(87) PCT Pub. No.: WO2020/216846
PCT Pub. Date: Oct. 29, 2020

(65) Prior Publication Data
US 2022/0213682 A1    Jul. 7, 2022

(30) Foreign Application Priority Data
Apr. 23, 2019  (SE) .................................... 1950497-6

(51) Int. Cl.
*B32B 3/12* (2006.01)
*B32B 7/027* (2019.01)
(Continued)

(52) U.S. Cl.
CPC .............. *E04B 1/942* (2013.01); *B32B 3/12* (2013.01); *B32B 7/027* (2019.01); *B32B 7/12* (2013.01);
(Continued)

(58) Field of Classification Search
None
See application file for complete search history.

(56) References Cited

U.S. PATENT DOCUMENTS 2,710,265 A * 6/1955 Lichtenstein .......... D21H 17/66
427/442
4,606,959 A   8/1986 Hillinger
(Continued)

FOREIGN PATENT DOCUMENTS

CN     203769105 U    8/2014
DE   202007004157 U1  7/2007
(Continued)

OTHER PUBLICATIONS

Toyokawa et al., machine translation of JP 2018-199267 Abstract and Description, Dec. 20, 2018 (Year: 2018).*
(Continued)

*Primary Examiner* — Mary I Omori
(74) *Attorney, Agent, or Firm* — Sandberg Phoenix & von Gontard P.C.

(57) ABSTRACT

The invention comprises a fire retardant board comprising a core formed from flute paper, wherein the flute paper is pre-impregnated with a flame retardant. The core is formed as a three dimensional body presenting a first face and a second face opposed to said first face and a wall structure which defines a plurality of channels intersecting the first face at an angle (a) which is 90 degrees or less than 90 degrees. The board further comprises a first liner attached to the first face and an adhesive arranged to fix the first liner to the first face of the core. The invention further comprises a method for manufacturing a fire retardant board comprising the steps of providing a core formed from flute paper, which is pre-impregnated with a flame retardant, applying an adhesive to the first face of the core, and laminating a first liner to the first face of the board.

25 Claims, 5 Drawing Sheets

(51) Int. Cl.
  *B32B 7/12* (2006.01)
  *B32B 15/12* (2006.01)
  *B32B 15/20* (2006.01)
  *E04B 1/94* (2006.01)
  *E04C 2/34* (2006.01)

(52) U.S. Cl.
  CPC .............. *B32B 15/12* (2013.01); *B32B 15/20* (2013.01); *E04C 2/3405* (2013.01); *B32B 2250/03* (2013.01); *B32B 2250/40* (2013.01); *B32B 2260/028* (2013.01); *B32B 2260/04* (2013.01); *B32B 2262/101* (2013.01); *B32B 2307/3065* (2013.01); *B32B 2607/00* (2013.01); *E04C 2002/3444* (2013.01)

(56) References Cited

U.S. PATENT DOCUMENTS

| | | | | |
|---|---|---|---|---|
| 4,935,281 | A | * | 6/1990 | Tolbert .................... B32B 15/04 428/116 |
| 6,139,945 | A | * | 10/2000 | Krejchi .................... B32B 5/18 428/542.2 |
| 2004/0123555 | A1 | | 1/2004 | Cole |
| 2008/0145600 | A1 | | 6/2008 | Hendren et al. |

FOREIGN PATENT DOCUMENTS

| | | | | |
|---|---|---|---|---|
| EP | 0068873 | A2 | * 1/1983 | ............... B32B 3/12 |
| GB | 1542730 | A | 3/1979 | |
| JP | 2013091210 | A | 5/2013 | |
| JP | 2018199267 | A | * 12/2018 | |
| WO | WO 91/10023 | A1 | * 7/1991 | |
| WO | 2011031209 | A1 | 3/2011 | |
| WO | 2011031223 | A1 | 3/2011 | |
| WO | WO-2018009055 | A1 | * 1/2018 | ............. B32B 15/02 |

OTHER PUBLICATIONS

4 Types of Paperboard, Jan. 21, 2019, Industry, https://paperbox.org/4-types-of-paperboard/ (Year: 2019).*
Chipboard (Particle Board) and MDF, Apr. 7, 2021, Hemel, https://www.hemel.com.tr/chipboard-vs-mdf (Year: 2021).*
What's the Difference between White Lined Chipboard and Grey Board?, Jan. 7, 2021 (Year: 2021).*
International Search Report to corresponding PCT Application No. PCT/EP2020/061339, mailed Aug. 7, 2020.
Written Opinion to corresponding PCT Application No. PCT/EP2020/061339, mailed Aug. 7, 2020.
Swedish Search Report to corresponding Swedish Patent Application No. 1950497-6, mailed Sep. 18, 2018.

* cited by examiner

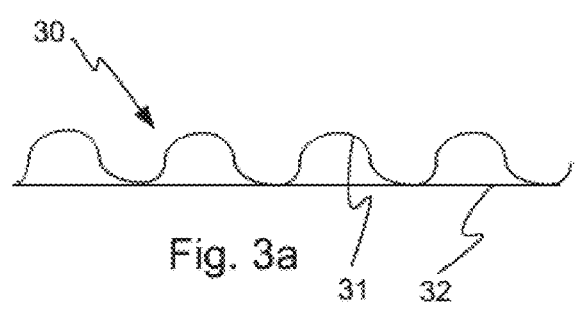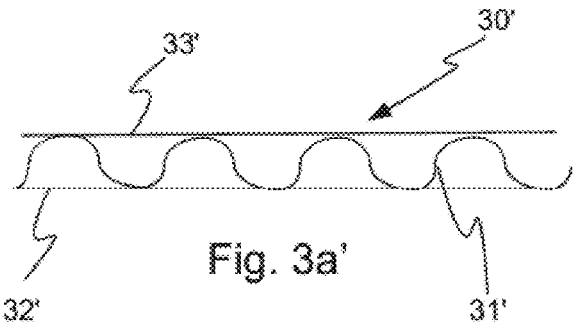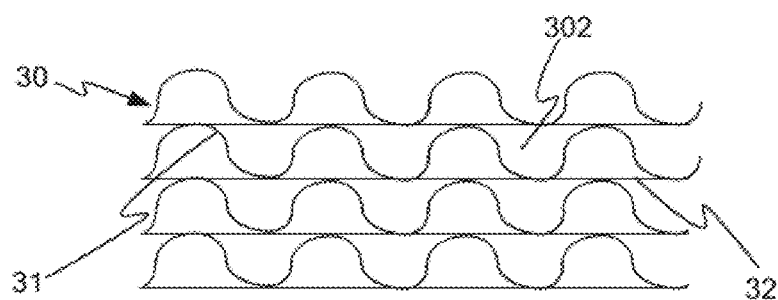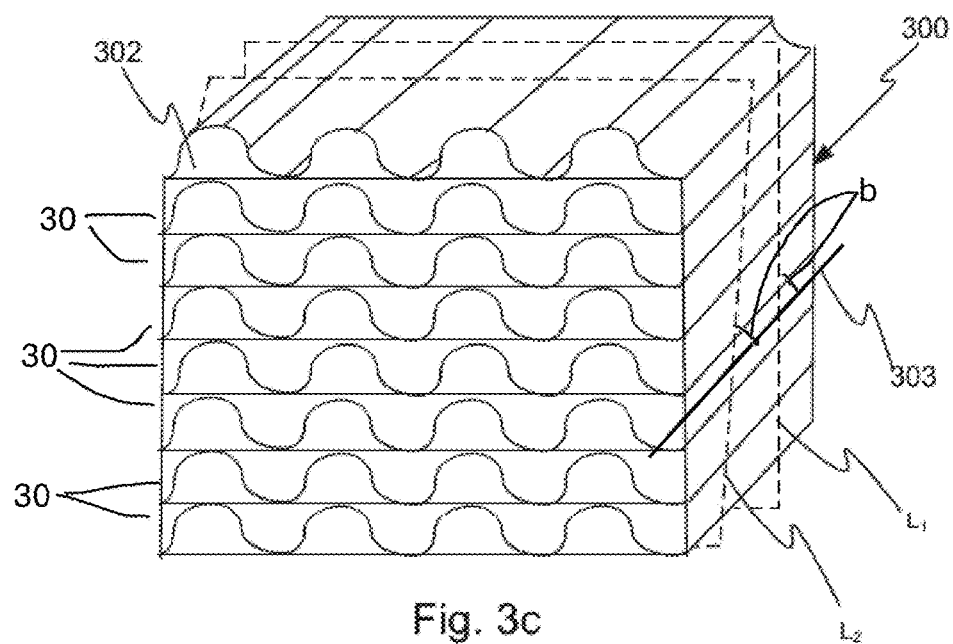

FIRE RETARDANT BOARD

CROSS-REFERENCE TO RELATED APPLICATIONS

This application is the US National Stage under 35 USC § 371 of International Application No. PCT/EP2020/061339, filed 23 Apr. 2020 which claims priority to Swedish Application No. 1950497-6 filed 23 Apr. 2019, both of which are incorporated herein by reference.

TECHNICAL FIELD

The invention relates to a fire retardant board and a method for manufacturing said board.

BACKGROUND

In recent years, boards based on a corrugated paper core sandwiched between a liner and/or printable facing sheets have been used to replace traditional board material, such as MDF, in e.g. furniture, advertising signs and in commercial stands. Fire retardant boards are disclosed in e.g. US20040123555.

To make the paper boards at least partly resistant to fire and ignitions, it is possible to provide the manufactured boards with a flame retardant material.

The core and/or the liner may be impregnated with a flame retardant. However, the present methods for providing the manufactured boards with a flame retardant material are associated with several drawbacks. When impregnating a manufactured board, an excess of flame retardant may be needed which may be damaging for the environment. Moreover, the impregnation step can be time consuming since the absorption of the flame retardant into the entire core and/or board has to be ensured.

Also, the subsequent drying time is time consuming. During drying, additional fans are often needed which require use of energy. In addition, the heat from the fans may warp the structure. Furthermore, besides being costly, the use of a high amount of flame retardant may be damaging to the environment. Impregnation of the core and/or liner may further alter the properties of the cardboard, such as its shape. In addition, a print surface of the liner may be damaged, by either changing its structure or visual properties, such as its colour.

Another option to make the boards fire retardant is to cover the liner with a protective layer made of fire retardant material. The layer creates a barrier and shields the flammable paper core from flames. Fire retardants are often harmful for the environment and it is desired to reduce the amount used.

An object of the present invention is to overcome these problems.

SUMMARY

According to a first aspect, the above and other objects are achieved, in full or at least in part, by a fire retardant board. The above object is achieved by a fire retardant board comprising a core formed from flute paper. The flute paper is pre-impregnated with a flame retardant, and the core is formed as a three dimensional body presenting a first face and a second face opposed to said first face. The core has a wall structure defining a plurality of channels intersecting the first face at an angle (a) which is 90 degrees or less than 90 degrees. Further, the board comprises a first liner attached to the first face and an adhesive arranged to fix the first liner to the first face of the core. The flute paper has been impregnated before formed into a core. The flute paper may be impregnated after its fabrication or, alternatively, flame retardant(s) may be added to the paper mass during the manufacture of the flute paper, thus giving a pre-impregnated flute paper.

This board is advantageous since it may delay the outbreak of fires or avoid the spreading of fire. It is thus beneficial to use this fire retardant board for e.g. panels, signs, divisional walls or marketing materials. To hinder the spreading of fire in for instance office environments, building sites or venues is of importance and may save lives in the event of fire. Importantly, since the core is impregnated with a flame retardant, the core itself is fire retardant even if flames were to penetrate the first liner.

The first liner may also be impregnated with a flame retardant. This gives additional fire retardant properties to the board. In case of fire, flames have to first penetrate the liner impregnated with a fire retardant before the core impregnated with a flame retardant is exposed. The first liner may be impregnated before or after being attached to the first face of the core. The first liner may be impregnated after its fabrication or, alternatively, flame retardant(s) may be added to the paper mass during the manufacture of the first liner, thus giving a pre-impregnated first liner.

According to a second embodiment, the flame retardant is an inorganic compound comprising sulphur, bromine, chlorine, phosphorous, nitrogen, aluminium and/or magnesium; an organic compound comprising sulphur, bromine, chlorine, phosphorous, nitrogen, aluminium and/or magnesium; a metal compound, and/or a mineral.

Preferably, the flame retardant is an inorganic compound comprising nitrogen and/or sulphur.

More preferably, the flame retardant is a mixture of inorganic nitrogen and sulphur compounds, such as SITOL FR 226075/37 KT 150+-T2946 from KiiLTO.

Most preferably, the flame retardant is a mixture of inorganic nitrogen and sulphur compounds, such as SITOL FR 226075/37 KT 150+-T2946 from KiiLTO, and an ammonium salt.

The skilled person realizes that the flame retardants may be used in different combinations.

The skilled person realizes that a fire retardant board according to the present teaching may include one or more different flame retardants. Thus, a fire retardant board according to the present teaching may include two, three, four or five different flame retardants, but may also include more than five different flame retardants. The flame retardants may be from the same group of compounds or from different groups of compounds.

The organic compound may be a carboxylic acid or a dicarboxylic acid.

Organic compounds comprising bromine and/or chlorine (organohalogen compounds or halogenated flame retardants) includes organochlorines such as chlorendic acid derivatives and chlorinated paraffins; organobromines such as decabromodiphenyl ether (decaBDE), decabromodiphenyl ethane (a replacement for decaBDE).

A brominated flame retardant may be selected from the group consisting of pentabromodiphenyl ether, octabromodiphenyl ether, decabromodiphenyl ether, tetrabromobisphenol A and/or hexabromocyclododecane. The brominated flame retardant may also be a polymeric brominated compound such as a brominated polystyrene, a brominated carbonate oligomer (BCO), a brominated epoxy oligomer (BEO), and/or a tetrabromophthalic anyhydride.

Most but not all halogenated flame retardants may be used in conjunction with a synergist to enhance their efficiency. Antimony trioxide may be used but other forms of antimony such as the pentoxide and sodium antimonate may also be used.

Organic compounds comprising phosphorous (organophosphorus compounds) include organophosphates such as triphenyl phosphate (TPP), resorcinol bis(diphenyl-phosphate) (RDP), bisphenol A diphenyl phosphate (BADP), and tricresyl phosphate (TCP); phosphonates such as dimethyl methylphosphonate (DMMP); and phosphinates such as aluminium diethyl phosphinate.

Organic compounds comprising both phosphorus and halogen include tris(2,3-dibromopropyl) phosphate (brominated tris) and chlorinated organophosphates such as tris(1, 3-dichloro-2-propyl)phosphate (chlorinated tris or TDCPP) and tetrakis(2-chlor-ethyl)dichloroisopentyldiphosphate (V6).

Other examples of flame retardants present in a fire retardant board according to the present teaching are aluminum diethylphosphinate, ammonium polyphosphate, bisphenol A diphosphate, melamine polyphosphate, phenoxyphosphazene, poly(phosphonate-co-carbonate), polyphosphonate, resorcinol bis-diphenylphosphate, siloxanes and silicones, di-Me, di-Ph, polymers with Ph silsesquioxanes, substituted amine phosphate mixture, tetrakis (2,6-dimethylphenyl)-m-phenylene biphosphate, triphenyl phosphate, and disodium tetraborate pentahydrate.

The mineral may be aluminium hydroxide (ATH), magnesium hydroxide (MDH), huntite and hydromagnesite, various hydrates, red phosphorus, and boron compounds, such as borates.

The flame retardant may comprise bromine and/or an ammonium or carboxylic salt.

The flame retardant may also comprise water and mineral such as silicon oxide grains and/or kaolinite grains.

According to another embodiment, the channels intersect the first face at an angle (a) of between 45-85 degrees. An angle (a) of intersection being less than 90 degrees, such as 45-85 degrees gives a structure of high strength and stability. The tilted structure results in an increased mechanical strength of the core and an increased surface area for the application of an adhesive in the manufacturing of a board according to the present teachings. The increased adhesive surface yields stronger joints between the core and the liner and it also prevents the risk of cutting the core between the corrugated flute paper and the flat sheet of flute paper. This is also beneficial since such a tilted channel structure yields a more clean cut when cutting the core during the manufacturing process. This provides a more esthetical cutting surface of the core.

According to another embodiment, a second liner is attached to the second face of the core by means of an adhesive. This is advantageous since both sides of the core is protected by a liner, which increases the strength of the board. Further, the liner may, for instance, be printed or painted and be visually appealing for a spectator from both sides.

The second liner may be impregnated with a flame retardant. This is advantageous since it protects the core even further from fire and can delay and/or hinder the spreading of fire. Thus, flames have to penetrate both the first and second liner impregnated with flame retardant in order for the fire/flame to spread to the other side of the board. The second liner may be impregnated before or after being attached to the second face of the core. The second liner may be impregnated after its fabrication or, alternatively, flame retardant(s) may be added to the paper mass during the manufacture of the second liner, thus giving a pre-impregnated second liner.

According to one embodiment, the adhesive may be a polymer resin, such as a hot melt adhesive or a setting resin, a glue or a glue comprising glass fibre. A hot melt adhesive is advantageous since it does not comprise any water, resulting in a shorter drying time than when an adhesive comprising water is used.

According to another embodiment, the first liner and/or the second liner comprises a flame-resistant layer and/or a flame retardant. This is advantageous since a flame-resistant layer causes the board to be even further fire retardant. The flame-resistant layer provides an additional barrier that fire has to break before reaching the core of the board. In addition, the flame-resistant layer may hold the structure together, preventing glowing pieces of the board from falling from the board and spread the fire. The first liner and/or the second liner may be impregnated with a flame retardant. The first liner and/or the second liner may be impregnated before or after being attached to the first or second face of the core, respectively. The first liner and/or the second liner may be impregnated after their fabrication or, alternatively, flame retardant(s) may be added to the paper mass during the manufacture of the first liner and/or the second liner, thus giving a pre-impregnated first liner and/or a pre-impregnated second liner.

According to one embodiment, the flame-resistant layer comprises aluminum foil, a flame-resistant polymer adhesive and/or glass fibre. Aluminum foil is preferable since it is ductile and has low density. It is commercially available and can hold the board together during an outbreak of fire as described above, which prevents glowing pieces of the board from falling from the board and spread the fire.

A flame-resistant polymer adhesive will maintain the laminated structure of the liner and/or the area between the liner and the corrugated board. If delamination occurs, oxygen will enter and a possible fire will increase additionally. Thus, a flame-resistant polymer will increase the fire retardance of the board further. Glass fibre has the advantage that it is commercially available, and is therefore a cheap and abundant material.

According to another embodiment, the liner comprises a paperboard, a polymer adhesive, preferably polyethylene, and a surface layer of fine print paper. This is advantageous since it gives a liner, which provides a surface, which may be printed, painted or otherwise decorated.

According to one embodiment, the fire retardant board has a Euroclass classification of C or higher. Alternatively, or additionally, the fire retardant board passes an NFPA 701 test. This is advantageous since the board has proven to achieve a certain level of fire retardance.

According to a second aspect, there is provided a method for manufacturing a fire retardant board formed as a three dimensional body. The method comprises the step of providing a core formed from flute paper, which is pre-impregnated with a flame retardant. The core is formed as a three dimensional body presenting a first face and a second face and a wall structure defining a plurality of channels. Each channel has a longitudinal axis intersecting the first face at an angle "a" which is 90 degrees or less than 90 degrees. The method further comprises the steps of applying an adhesive to the first face of the core, and laminating a first liner to the first face of the core.

This method is advantageous since the flute paper forming the core has been pre-impregnated with the flame retardant before the manufacturing of the board begins. Thus, issues such as deformation of the board from an impregnation step performed after the manufacturing of the board and/or core is avoided. Also, since the flute paper is pre-impregnated, it is certain that a large part of core, even the entire core, has been treated with the flame retardant. If impregnation is performed after the core or board has been produced, there is a risk that the flame retardant does not reach all angles, channels and/or intersections in the structure. Further, in such process, the flame retardant will not reach the flute paper of the core where the flute paper is attached to itself or the areas where the core is attached to the liner. In addition, a smaller amount of flame retardant is required when pre-impregnating the flute paper rather than impregnating the entire structure after its manufacturing. Hence, the costs for flame retardant and the impact on the environment can be reduced.

The first liner may be impregnated before or after being laminated to the first face of the core. The first liner may be impregnated after its fabrication or, alternatively, flame retardant(s) may be added to the paper mass during the manufacture of the first liner, thus giving a pre-impregnated first liner.

According to one embodiment, there is provided a method wherein the core comprises a plurality of corrugated boards made from flute paper pre-impregnated with a flame retardant. The corrugated board is manufactured by a method comprising the steps of corrugating a first sheet of flute paper pre-impregnated with a flame retardant by letting the flute paper pass between two corrugating rolls, applying an adhesive to the corrugated first sheet formed in the previous step or to a second sheet of flute paper pre-impregnated with a flame retardant, and laminating the second sheet of flute paper pre-impregnated with a flame retardant to the corrugated first sheet of flute paper pre-impregnated with a flame retardant. The second sheet of flute paper may be both corrugated or flat.

According to a second embodiment, there is provided a method wherein the core is formed from a plurality of corrugated boards made from flute paper pre-impregnated with a flame retardant, and wherein each corrugated board has a first and a second side. The core is manufactured by a method comprising the steps of providing a structure by stacking at least one corrugated board onto a second corrugated board such that a plurality of channels, which all have a longitudinal axis in the same direction, are formed in the formed structure. The two adjacent corrugated boards are joined by applying an adhesive to said first or second side of one of the adjacent corrugated boards. The method further comprises the steps of placing said first side of said one corrugated board facing said second side of the adjacent corrugated board and cutting the structure such that the cut intersects the longitudinal axis of the channels of the structure at an angle "b" which is 90 degrees or less than 90 degrees.

According to another embodiment, there is provided a method wherein the corrugated boards are single-face corrugated boards. This is advantageous since the core of the board will have a low weight. A single-face corrugated board is also easier to produce than a corrugated board since a step of adding a second flat sheet of flute paper to the corrugated flute paper is not needed.

According to yet another embodiment, there is provided a method wherein the flame retardant is an inorganic compound comprising sulphur, bromine, chlorine, phosphorous, nitrogen, aluminium and/or magnesium; an organic compound comprising sulphur, bromine, chlorine, phosphorous, nitrogen, aluminium and/or magnesium; a metal compound, and/or a mineral.

Preferably, the flame retardant is an inorganic compound comprising nitrogen and/or sulphur.

More preferably, the flame retardant is a mixture of inorganic nitrogen and sulphur compounds, such as SITOL FR 226075/37 KT 150+-T2946 from KiiLTO.

Most preferably, the flame retardant is a mixture of inorganic nitrogen and sulphur compounds, such as SITOL FR 226075/37 KT 150+-T2946 from KiiLTO, and an ammonium salt.

The skilled person realizes that the flame retardants may be used in different combinations.

The skilled person realizes that a fire retardant board according to the present teaching may include one or more different flame retardants. Thus, a fire retardant board according to the present teaching may include two, three, four or five different flame retardants, but may also include more than five different flame retardants. The flame retardants may be from the same group of compounds or from different groups of compounds.

The organic compound may be a carboxylic acid or a dicarboxylic acid.

Organic compounds comprising bromine and/or chlorine (organohalogen compounds or halogenated flame retardants) includes organochlorines such as chlorendic acid derivatives and chlorinated paraffins; organobromines such as decabromodiphenyl ether (decaBDE), decabromodiphenyl ethane (a replacement for decaBDE).

A brominated flame retardant may be selected from the group consisting of pentabromodiphenyl ether, octabromodiphenyl ether, decabromodiphenyl ether, tetrabromobisphenol A and/or hexabromocyclododecane. The brominated flame retardant may also be a polymeric brominated compound such as a brominated polystyrene, a brominated carbonate oligomer (BCO), a brominated epoxy oligomer (BEO), and/or a tetrabromophthalic anyhydride.

Most but not all halogenated flame retardants may be used in conjunction with a synergist to enhance their efficiency. Antimony trioxide may be used but other forms of antimony such as the pentoxide and sodium antimonate may also be used.

Organic compounds comprising phosphorous (organophosphorus compounds) include organophosphates such as triphenyl phosphate (TPP), resorcinol bis(diphenyl-phosphate) (RDP), bisphenol A diphenyl phosphate (BADP), and tricresyl phosphate (TCP); phosphonates such as dimethyl methylphosphonate (DMMP); and phosphinates such as aluminium diethyl phosphinate.

Organic compounds comprising both phosphorus and halogen include tris(2,3-dibromopropyl) phosphate (brominated tris) and chlorinated organophosphates such as tris(1,3-dichloro-2-propyl)phosphate (chlorinated tris or TDCPP) and tetrakis(2-chlor-ethyl)dichloroisopentyldiphosphate (V6).

Other examples of flame retardants present in a fire retardant board according to the present teaching are aluminum diethylphosphinate, ammonium polyphosphate, bisphenol A diphosphate, melamine polyphosphate, phenoxyphosphazene, poly(phosphonate-co-carbonate), polyphosphonate, resorcinol bis-diphenylphosphate, siloxanes and silicones, di-Me, di-Ph, polymers with Ph silsesquioxanes, substituted amine phosphate mixture, tetrakis (2,6-dimethylphenyl)-m-phenylene biphosphate, triphenyl phosphate, and disodium tetraborate pentahydrate.

The mineral may be aluminium hydroxide (ATH), magnesium hydroxide (MDH), huntite and hydromagnesite, various hydrates, red phosphorus, and boron compounds, such as borates.

The flame retardant may comprise bromine and/or an ammonium or carboxylic salt.

The flame retardant may also comprise water and mineral such as silicon oxide grains and/or kaolinite grains.

According to one embodiment, there is provided a method wherein the angle "a" and/or "b" is between 45 and 85 degrees. This is advantageous since the formed core has a tilted structure in which the longitudinal axis of the channels intersects the first face of the core at an angle less than 90 degrees. This results in a core with high strength and stability. The tilted structure gives rise to an increased mechanical strength of the core and an increased surface area for the application of an adhesive in the manufacturing of a board according to the present teachings. The increased adhesive surface yields stronger joints between the core and the liner and it also prevents the risk of cutting the core between the corrugated flute paper and the flat sheet of flute paper.

Also, it is more easy to achieve a clean esthetically appearing cut using such an angle "a" or "b".

According to another embodiment, the method further comprises the steps of applying an adhesive to the second face of the core and laminating a second liner to the second face of the core. This is advantageous since both sides of the produced boards of will be protected by a liner, which increases the strength of the board. Further, the liner may for instance be printed or painted and the resulting board will be visually appealing for a spectator from both sides. The second liner may be impregnated before or after being laminated to the second face of the core. The second liner may be impregnated after its fabrication or, alternatively, flame retardant(s) may be added to the paper mass during the manufacture of the second liner, thus giving a pre-impregnated second liner.

According to yet another embodiment, there is provided a method wherein the adhesive may be a polymer resin, such as a hot melt adhesive or a setting resin, a glue or a glue comprising glass fibre. A hot melt adhesive is advantageous since it does not comprise any water, resulting in a shorter drying time than when an adhesive comprising water is used.

According to another embodiment, there is provided a method wherein the first liner and/or the second liner comprises a flame-resistant layer and/or a flame retardant. This is advantageous since such a method will result in a board having a flame-resistant layer, which causes the board to be even further fire retardant. The flame-resistant layer provides an additional barrier which fire has to break before reaching the core of the board. In addition, the flame-resistant layer may hold the structure together, preventing glowing pieces of the board from falling from the board and spread the fire. The first liner and/or the second liner may be impregnated with a flame retardant. The first liner and/or the second liner may be impregnated before or after being attached to the first or second face of the core, respectively. The first liner and/or the second liner may be impregnated after their fabrication or, alternatively, flame retardant(s) may be added to the paper mass during the manufacture of the first liner and/or the second liner, thus giving a pre-impregnated first liner and/or a pre-impregnated second liner.

According to yet another embodiment, there is provided a method wherein the flame-resistant layer comprises aluminum foil, a flame-resistant polymer adhesive or glass fibre. Aluminum foil is preferable since it is ductile and has low density. It is commercially available and can hold the board together during an outbreak of fire which prevents glowing pieces of the board from falling from the board and spread the fire.

Other objectives, features and advantages of the present teachings will appear from the following detailed disclosure, from the attached claims, as well as from the drawings. It is noted that the teachings herein relate to all possible combinations of features.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise. The steps of any method disclosed herein do not have to be performed in the exact order disclosed, unless explicitly stated.

As used herein, the term "comprising" and variations of this term are not intended to exclude other additives, components, integers or steps.

BRIEF DESCRIPTION OF THE DRAWINGS

By way of example, embodiments of the claimed invention will now be described with reference to the accompanying drawings, in which:

FIG. 1b shows a schematic side view of the core of a board according to the present teachings shown in FIG. 1a;

FIG. 2b shows a schematic side view of the core of FIG. 2a;

FIGS. 3a and 3a' show a single-face corrugated board (a) and a corrugated board (a') respectively;

FIG. 3b shows a side view of a stack of single-face corrugated boards;

FIG. 3c shows a three dimensional representation of stacked single-face corrugated boards;

DETAILED DESCRIPTION OF PREFERRED EMBODIMENTS

A fire retardant board 200 comprises a core 100, formed from flute paper, which has been pre-impregnated with a flame retardant.

A fire retardant board is herein defined as a board having properties delaying the spreading of fire and being less susceptible to ignition than a conventional board.

A flame retardant, also referred to as a fire retardant, is defined herein as an agent, material or substance used to slow down and/or stop the spread of fire and/or reduce its intensity.

One embodiment of the fire retardant board will now be described in relation to FIGS. 1 to 2.

Figure 1A:
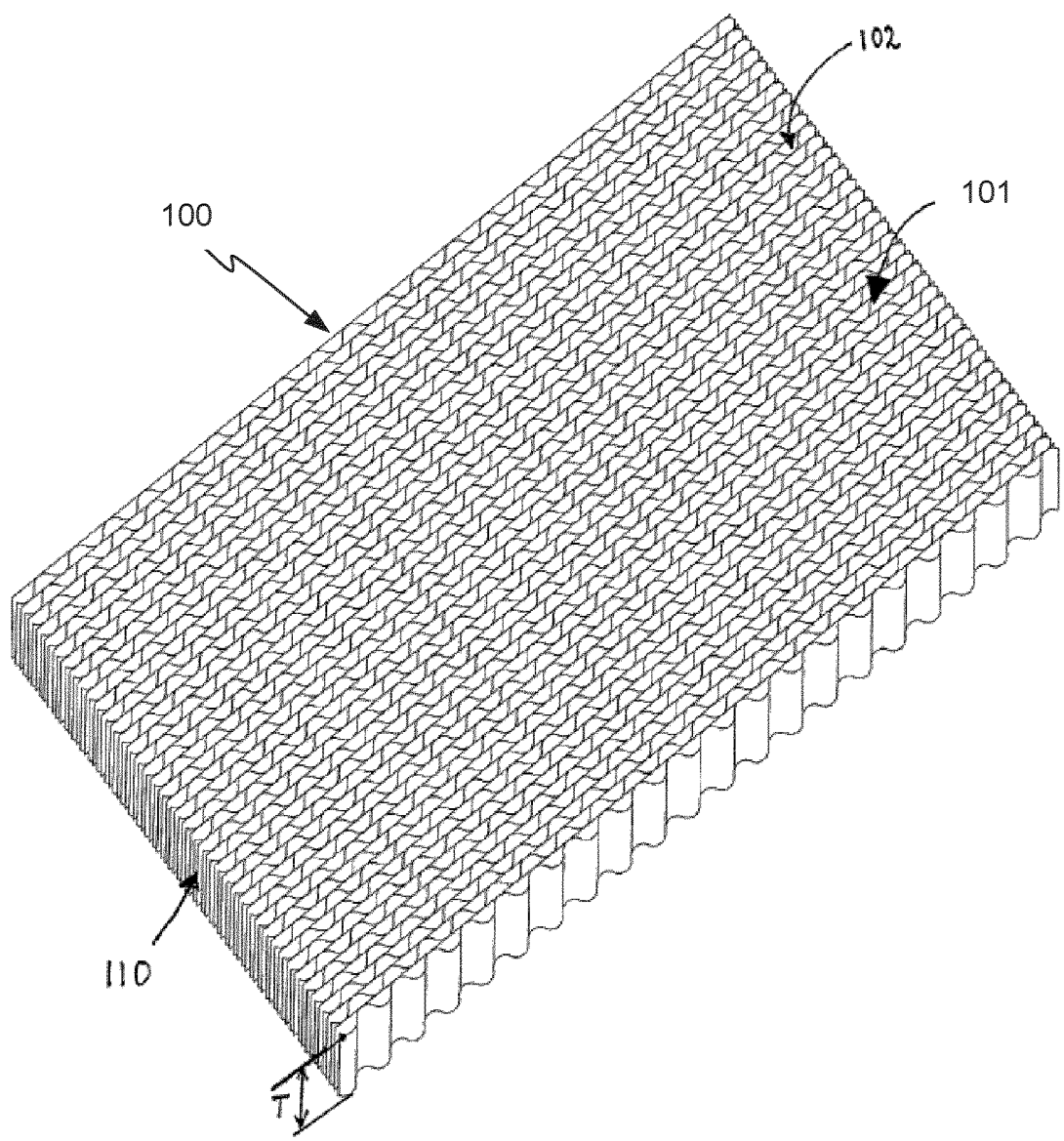
FIG. 1a shows a schematic perspective view of a core of a board according to the present teachings with a tilted wall structure.
Figure 1B:
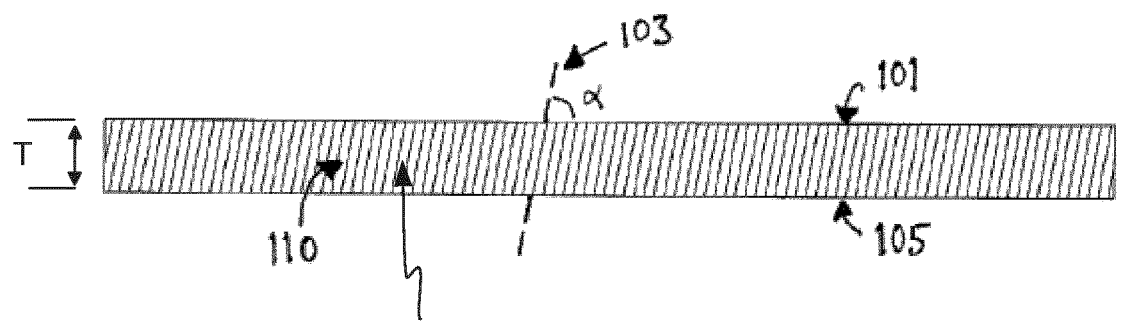

FIGS. 1a and 1b show schematic perspective views of the core 100 having a tilted wall structure. The flute paper of the core 100 has been pre-impregnated with a flame retardant (not shown). The core 100 is formed as a three dimensional body presenting a first face 101 and a second face 105 opposed, and in relation thereto parallel, to said first face 101. The core 100 has a wall structure defining a plurality of channels 102 intersecting the first face 101 at an angle α. The core 100 has a core thickness T and it has side portions 110. Typically, the thickness T of the core 100 is between 3 to 60 mm, such as 5 to 50 mm, such as 7-30 mm, such as 9-20 mm, such as 12 to 18 mm, preferably between 10 and 17 mm, such as between 13 and 17 mm, and most preferred 16 mm.

FIG. 1b is a side view of the core 100 illustrated in FIG. 1a, showing the side portion 110. The channels 102 of the internal wall structure are tilted in relation to the faces 101, 105, i.e. each channel 102 has a longitudinal axis 103 that intersects the faces 101, 105 at an angle α of intersection being 90 degrees or less than 90 degrees, such as 45-85 degrees.

In FIGS. 1a and 1b, the core 100 is formed from flute paper which has been pre-impregnated with a flame retardant. The pre-impregnated flute paper is formed into single-face corrugated boards, herein also referred to as single-face well. The flute paper may be impregnated after its fabrication or, alternatively, flame retardant(s) may be added to the paper mass during the manufacture of the flute paper, thus giving a pre-impregnated flute paper. Hence, the flute paper is impregnated before it is formed into single-face corrugated boards. The single-face corrugated boards are then stacked to form a structure, which is then cut into core pieces 100. The skilled person realises that instead of corrugated fluted paper, creased paper, paper having a zigzag shape, or paper having any form which yields channels can be used. In such case, the paper is impregnated before it is formed into i.e. a creased paper or a paper having a zigzag shape. The paper may be impregnated after its fabrication or, alternatively, flame retardant(s) may be added to the paper mass during the manufacture of the flute paper, thus giving a pre-impregnated flute paper.

Figure 2A:
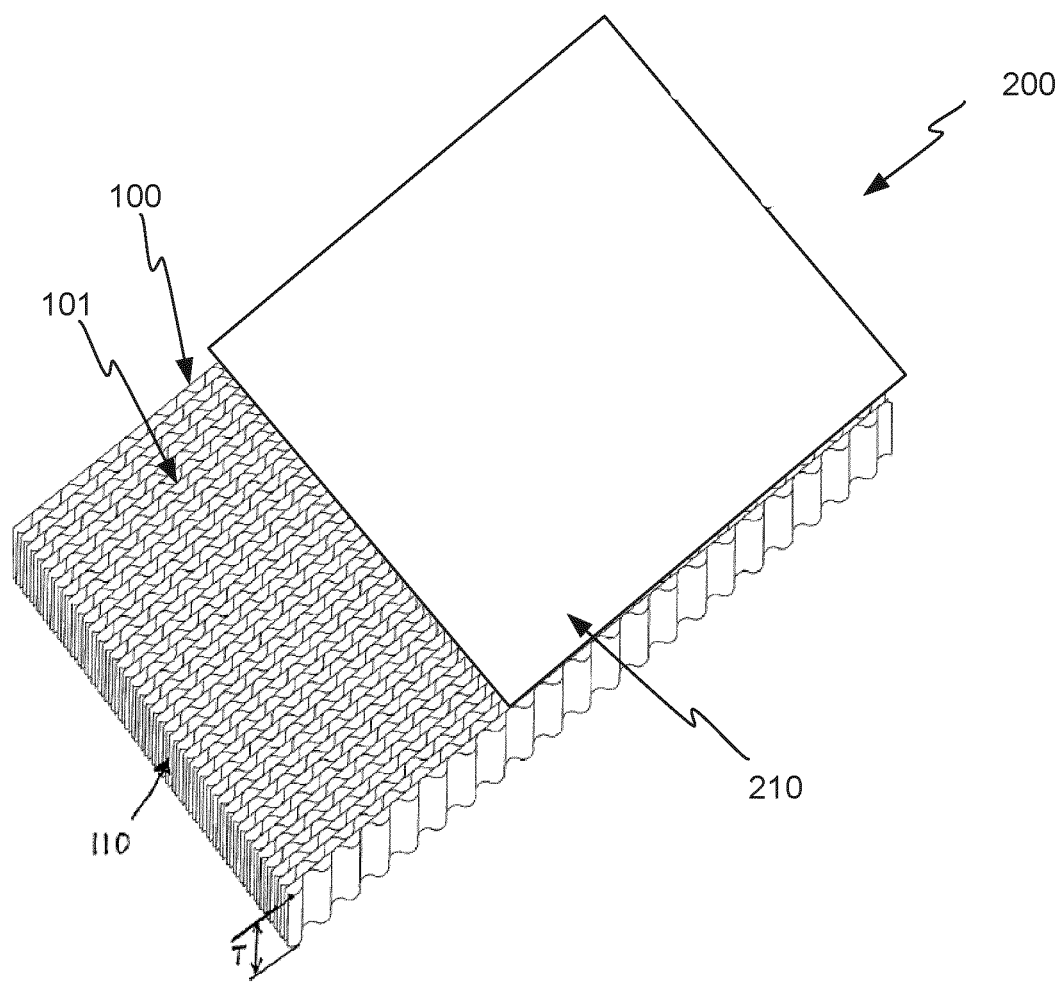
FIG. 2a shows a schematic perspective view of a core partly covered by a liner.

FIG. 2a shows a board 200 comprising the core 100 having its first face 101 partly covered with a liner 210.

Figure 2B:
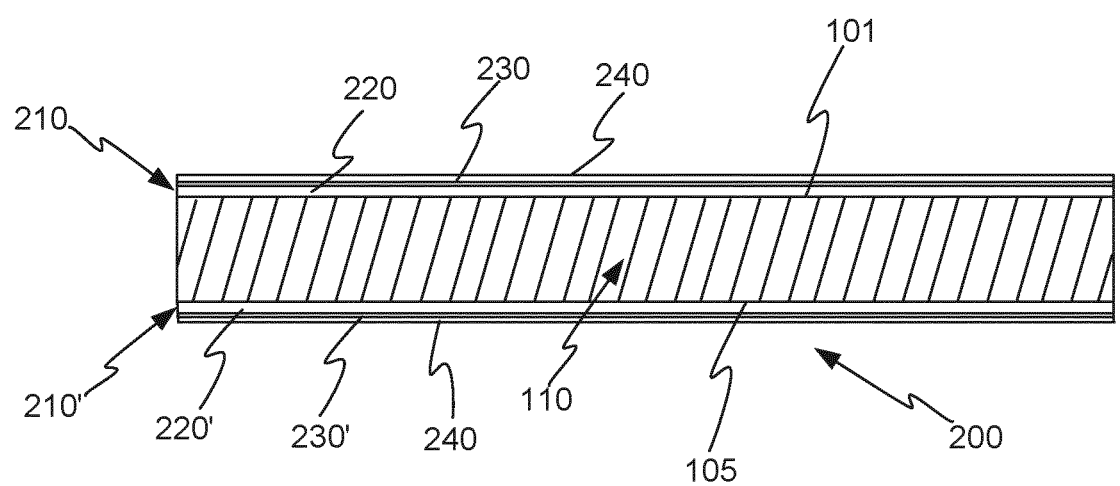

In FIG. 2b, the side portion 110 of the board 200 shown in FIG. 2a is illustrated. The first 101 and second 105 faces have a respective liner 210, 210' attached thereto. In the embodiment shown in FIG. 2b, each liner 210, 210' comprises a first layer 220, 220', an intermediate flame-resistant layer 230, 230', and a surface layer 240, 240'. The boards 200 shown in FIGS. 1a-2b comprises a three dimensional core 100 comprising a plurality of channels. Each channel has a longitudinal axis 103 intersecting the first face 101 at an angle α of 90 degrees or less than 90 degrees, such as 45-85 degrees. Such a tilted structure gives rise to an increased mechanical strength of the core and an increased surface area for the application of an adhesive in the manufacturing of a board according to the present teachings. The increased adhesive surface yields stronger joints between the core 100 and the liner 210 and it also prevents the risk of cutting the core 100 between the corrugated flute paper and the flat sheet of flutes paper. Another embodiment comprises only one liner 210.

If fire comes into contact with the side portions 110 of the core 100, which are not covered by the liner 210, 210', the pre-impregnation of the core 100 itself protects the core 100 from catching fire.

Another positive consequence of pre-impregnating the fluted paper is that the single-face corrugated board formed from said paper will act as a conventional un-impregnated paper during further processing of the material. The products formed from the pre-impregnated fluted paper can be e.g. cut, printed or formed into single-face corrugated boards. If the core 100 were to be impregnated after its manufacture, but before the liner 210 is applied, there would be a risk of deformation. Furthermore, it would be a time consuming impregnation process, and it would require an excess of flame retardant. The use of excess flame retardant is not environmentally friendly and it is expensive.

If the manufactured board 200, (a core with at least one liner) were to be impregnated after its manufacturing, there would be a risk that the board 200 would become deformed or otherwise negatively affected, such as having a warped or visually damaged liner. By impregnating the fluted paper before forming the core 100, the above problems are avoided.

Also, if the core 100 or the entire board 200 is impregnated after its manufacturing, a larger quantity of flame retardant is required since the entire structure then has to be dipped into and/or sprayed with a flame retardant, and subsequently dried. The excess use of flame retardant is expensive and the subsequent drying step is time and energy consuming. Furthermore, it may also have a damaging impact on the environment. Another disadvantage associated with impregnating the core 100 or board 200 after its manufacture is that the structure is likely to be deformed and thus needs further adjustments, adding further steps to the method of manufacturing. Furthermore, depending on the adhesive used to manufacture the core 100, the flame retardant may not be able to impregnate the adhering surface between the corrugated paper and the flat paper if the board 200 is impregnated after its manufacture. By impregnating the flute paper and subsequently forming a core 100 from the impregnated paper, wherein the impregnated paper has been impregnated during or after its manufacture, a core 100 being completely impregnated with flame retardant(s) is obtained. Thus, adhering surfaces, corners and/or areas hard to reach within the core 100 are without doubt surely impregnated with the flame retardant(s).

The liner 210, 210' shown in FIGS. 2a and 2b comprises a first layer 220, 220' adjacent to the core 100, followed by a flame-resistant layer 230, 230' adhered to the first layer 220, 220'. The flame-resistant layer 230, 230' may be adhered to the first layer 220, 220' by a layer of an adhesive (not shown). In a specific embodiment, the adhesive is polyethylene (PE). PE is suitable since it is commercially available and thus inexpensive. PE also melts when exposed to heat, and then becomes an adhesive. The liner 210, 210' also comprises a surface layer 240, 240'. The surface layer 240, 240' is adhered to the flame-resistant layer 230, 230' by an adhesive, such as a glue or a fire retarding glue.

The first layer 220, 220' is comprised of cardboard or paperboard. To improve the fire retarding properties of the liner 210, 210' even further, a flame-resistant layer 230, 230' may be comprised in the liner 210, 210' (see the embodiment shown in FIG. 2b).

The flame-resistant layer 230, 230' may be a thin layer of aluminium foil. Herein, aluminium foil is defined as a film comprising the metal aluminium, having a thickness of 5 to 60 μm, such as 10 to 50 μm, preferably 30 μm.

Alternatively, the flame-resistant layer 230, 230' may be a glass fibre, a metal other than aluminium, a flame-resistant polymer adhesive or a sand or clay. The use of aluminium is preferred since aluminium is a light weight metal with low density, and is ductile. It is not especially sensitive to heat and will provide stability to the board 200. The aluminium foil prevents flames from entering the core 100 of the board 200 and thus increases the fire retardant properties of the board 200. In addition, the aluminium foil will keep the board 200 together in the event of a possible fire such that glowing pieces of the board will not fall down from the board 200 and spread the fire further.

In the embodiment shown in FIG. 2b, the flame resistant layer is present between the first layer 220, 220' and the surface layer 240, 240'. The surface layer 240, 240' is configured to provide a surface, which may be e.g. smooth, printable, paintable and/or water repellent. The surface layer 240, 240' typically is comprised of fine print paper, also referred to as print grade paper. The surface layer 240, 240' may also be a regular paper. However, the surface layer 240, 240' may be any suitable material such as a fabric, wood, veneer, polymer, film or sheet. The surface layer 240, 240' may also be fire retardant.

The surface layer 240, 240' is attached to the flame-resistant layer 230, 230' by a glue (not shown), which may be a fire retardant glue.

The liner may also be formed solely of laminated cardboard or another material such as a high density fibre board (HDF), or medium density fibre board (MDF) (not shown).

The liner may further be a sheet of paper, cardboard laminate, sheet metal, wood veneer, polymer films or sheets, a homogenous material such as cardboard or paperboard or other materials which is attachable to the core 100 to provide a surface, which may be e.g. smooth, printable and/or water repellent.

A basic liner (not shown) may comprise a first layer of paper board, an adhesive, which may be PE, and a surface layer, preferably comprised of paper, such as fine print paper to provide a surface, which may be e.g. smooth, printable, paintable and/or water repellent.

In one embodiment, the board comprises a core in which the flute paper has been pre-impregnated with a flame retardant, and a liner comprising a flame retardant layer comprised of aluminium foil. The flute paper may have been impregnated after its fabrication or, alternatively, flame retardant(s) may have been added to the paper mass during the manufacture of the flute paper, thus giving a pre-impregnated flute paper.

In one embodiment, the board comprises a core in which the flute paper has been pre-impregnated with a flame retardant, and a liner, which has been pre-impregnated with a flame retardant. The flute paper may have been impregnated after its fabrication or, alternatively, flame retardant(s) may have been added to the paper mass during the manufacture of the flute paper, thus giving a pre-impregnated flute paper. The liner may have been impregnated after its fabrication or, alternatively, flame retardant(s) may have been added to the paper mass during the manufacture of the liner, thus giving a pre-impregnated liner.

In one embodiment, the board comprises a core in which the flute paper has been pre-impregnated with a flame retardant, and a liner which has been pre-impregnated with a flame retardant and which comprises a flame retardant layer comprised of aluminium foil. The flute paper may have been impregnated after its fabrication or, alternatively, flame retardant(s) may have been added to the paper mass during the manufacture of the flute paper, thus giving a pre-impregnated flute paper. The liner may have been impregnated after its fabrication or, alternatively, flame retardant(s) may have been added to the paper mass during the manufacture of the liner, thus giving a pre-impregnated liner.

In addition, the liner 210, 210' may also be pre-impregnated with a fire retardant. This means that even if flames where to penetrate the flame-resistant layer 230, 230', as flames might do after a certain time or at a sufficiently high temperature, the first layer 220, 220' comprised of e.g. cardboard beneath the flame-resistant layer 230, 230' being fire retardant which protects the core 100 of the board 200 even further since the flames have an additional barrier to cross before entering the core 100 of the board 200. The liner 210, 210' may be impregnated before or after being attached to the face of the core. The liner 210, 210' may have been impregnated with fire retardant(s) after its fabrication or, alternatively, fire retardant(s) may have been added to the paper mass during the manufacture of the liner 210, 210', thus giving a pre-impregnated liner 210, 210'.

With reference to FIG. 3a, a piece of a single-face corrugated board 30, also referred to as single-face well, is shown. Each single-face corrugated board 30 has a first and a second side, one being a flat surface and the other side being a corrugated surface, defining channels 302 there between each having a longitudinal axis 303. FIG. 3a' shows a piece of corrugated board 30'. The boards 30, 30' both comprises a corrugated flute paper 31, 31' and a flat sheet of flute paper 32, 32'. In addition, the cardboard 30' comprises another flat sheet of flute paper 33'. Such a structure shown in FIG. 3a' is often referred to as a cardboard.

In FIG. 3b, several single-face corrugated boards 30 have been stacked onto each other. Between the corrugated flute paper 31 and the flat paper 32, channels 302 are defined. The extension of said channels 302 have a longitudinal axis 303 (see FIG. 3c).

A three dimensional stacked structure 300 of several single-face corrugated boards 30 is shown in FIG. 3c. Dashed lines $L_1$, $L_2$ indicate how the three dimensional structure 300 may be cut to form a core according to the present teachings. The stack 300 can be cut perpendicular to the longitudinal axis 303 of the channels 302 or at an angle (b) intersecting said axis 303 at an angle less than 90 degrees. The first dashed line $L_1$ indicates a cut at an angle of 90 degrees. The second dashed line $L_2$ indicates a cut at an angle less than 90 degrees, such as 45-85 degrees.

The skilled person understands that corrugated boards 30' (as shown in FIG. 3a') can be stacked in the same manner and cut into boards as explained above for FIG. 3c.

Figure 3D:
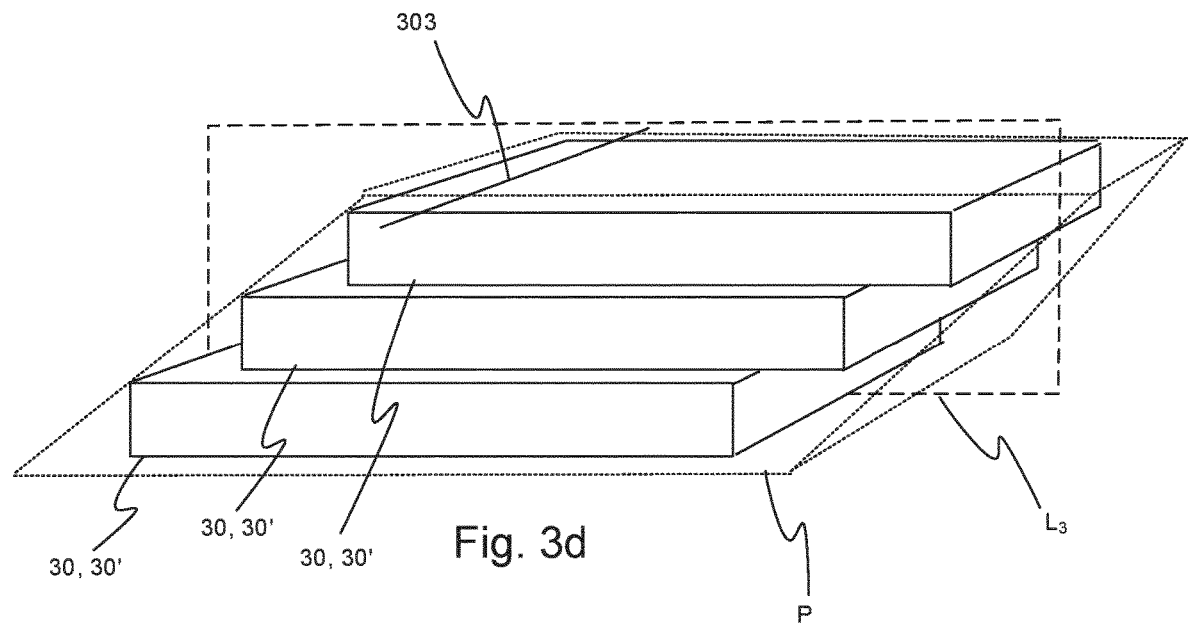
FIG. 3d shows a schematic perspective view from one side of how the boards shown in FIGS. 3a and 3a' may be stacked.
Figure 3E:
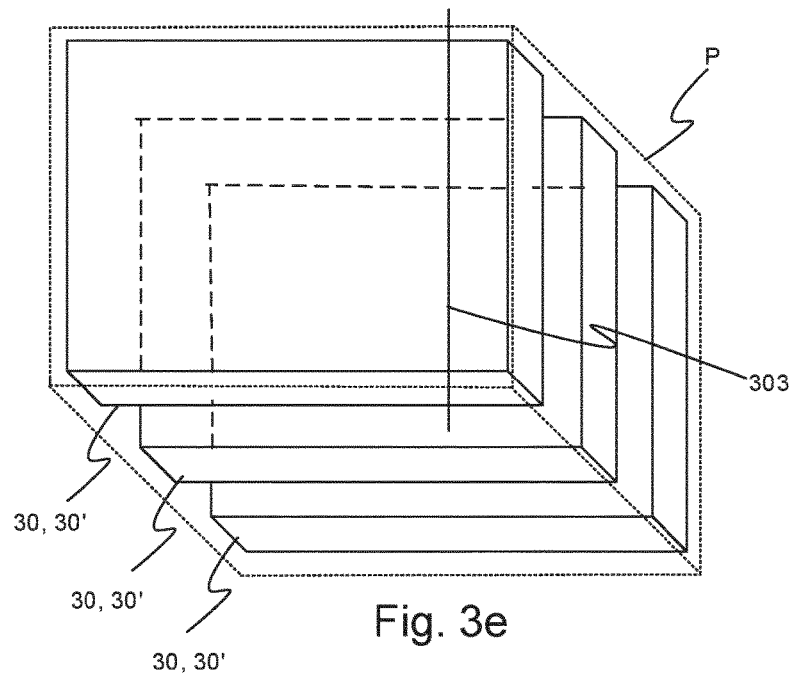
FIG. 3e shows the stacking shown in FIG. 3d seen from above.

In FIG. 3d, an alternative stacking of the corrugated boards 30, 30' is shown. The structure can be seen from above in FIG. 3e. (However, the corrugation of the paper is not shown in FIG. 3d or FIG. 3e). Each corrugated board 30, 30' (as shown in FIG. 3a or 3a') has been stacked on top of another in an offset manner. This forms a three-dimensional structure 300' in the shape of a parallelepiped P. The parallelepiped P is indicated by a dotted line in both FIGS. 3d and 3e. The dashed line $L_3$ in FIG. 3d indicates how the three-dimensional structure 300' may be cut to form a core according to the present teachings. The channels (not shown) of the boards 30, 30' are aligned along the longitudinal axis 303. The cut indicated by $L_3$ may intersect the longitudinal axis 303 of the channels 302 at an angle of 90 degrees or less than 90 degrees as shown in FIG. 3e.

The flame retardant may be chosen from the group consisting of an inorganic compound comprising sulphur, bromine, chlorine, phosphorous, nitrogen, aluminium and/or magnesium; an organic compound comprising sulphur, bromine, chlorine, phosphorous, nitrogen, aluminium and/or magnesium; a metal compound, and/or a mineral.

Preferably the flame retardant is an inorganic compound comprising nitrogen and/or sulphur.

More preferably the flame retardant is a mixture of inorganic nitrogen and sulphur compounds, such as SITOL FR 226075/37 KT 150+-T2946 from KiiLTO.

Most preferably, the flame retardant is a mixture of inorganic nitrogen and sulphur compounds, such as SITOL FR 226075/37 KT 150+-T2946 from KiiLTO, and an ammonium salt.

The skilled person realizes that the flame retardants may be used in different combinations.

The skilled person realizes that a fire retardant board according to the present teaching may include one or more different flame retardants. Thus, a fire retardant board according to the present teaching may include two, three, four or five different flame retardants, but may also include more than five different flame retardants. The flame retardants may be from the same group of compounds or from different groups of compounds.

The organic compound may be a carboxylic acid or a dicarboxylic acid.

Organic compounds comprising bromine and/or chlorine (organohalogen compounds or halogenated flame retardants) includes organochlorines such as chlorendic acid derivatives and chlorinated paraffins; organobromines such as decabromodiphenyl ether (decaBDE), decabromodiphenyl ethane (a replacement for decaBDE).

A brominated flame retardant may be selected from the group consisting of pentabromodiphenyl ether, octabromodiphenyl ether, decabromodiphenyl ether, tetrabromobisphenol A and/or hexabromocyclododecane. The brominated flame retardant may also be a polymeric brominated compound such as a brominated polystyrene, a brominated carbonate oligomer (BCO), a brominated epoxy oligomer (BEO), and/or a tetrabromophthalic anyhydride.

Most but not all halogenated flame retardants may be used in conjunction with a synergist to enhance their efficiency. Antimony trioxide may be used but other forms of antimony such as the pentoxide and sodium antimonate may also be used.

Organic compounds comprising phosphorous (organophosphorus compounds) include organophosphates such as triphenyl phosphate (TPP), resorcinol bis(diphenyl-phosphate) (RDP), bisphenol A diphenyl phosphate (BADP), and tricresyl phosphate (TCP); phosphonates such as dimethyl methylphosphonate (DMMP); and phosphinates such as aluminium diethyl phosphinate.

Organic compounds comprising both phosphorus and halogen include tris(2,3-dibromopropyl) phosphate (brominated tris) and chlorinated organophosphates such as tris(1,3-dichloro-2-propyl)phosphate (chlorinated tris or TDCPP) and tetrakis(2-chlor-ethyl)dichloroisopentyldiphosphate (V6).

Other examples of flame retardants present in a fire retardant board according to the present teaching are aluminum diethylphosphinate, ammonium polyphosphate, bisphenol A diphosphate, melamine polyphosphate, phenoxyphosphazene, poly(phosphonate-co-carbonate), polyphosphonate, resorcinol bis-diphenylphosphate, siloxanes and silicones, di-Me, di-Ph, polymers with Ph silsesquioxanes, substituted amine phosphate mixture, tetrakis (2,6-dimethylphenyl)-m-phenylene biphosphate, triphenyl phosphate, and disodium tetraborate pentahydrate.

The mineral may be aluminium hydroxide (ATH), magnesium hydroxide (MDH), huntite and hydromagnesite, various hydrates, red phosphorus, and boron compounds, such as borates.

The flame retardant may comprise bromine and/or an ammonium or carboxylic salt.

The flame retardant may also comprise water and mineral such as silicon oxide grains and/or kaolinite grains.

To impregnate the flute paper, it is run through a vessel containing the flame retardant. Alternatively, the flame retardant may be applied in other ways, such as spraying, soaking, immersing or forcing the flame retardant into the paper in a pressure chamber.

The flute paper may alternatively be impregnated in a shower. In such case, flute paper may be transported on a conveying belt while being sprinkled with a flame retardant by the shower.

After impregnation, the flute paper is dried.

The flame retardant may comprise bromine and/or an ammonium or carboxylic salt. It may also comprise water and mineral such as silicon oxide grains and/or kaolinite grains.

To classify fire retardant materials in Europe, the Euroclass system (EN 13501-1) comprising the tests EN13823 (single burning item test) and EN ISO 11925-2 (ignitability test) may be used. This classification system has different classes, wherein Euroclass A is the highest, indicating a material to be fire proof. A core 100 and board 200 as disclosed herein will preferably be classified as Euroclass C or higher, such as Euroclass B. A core 100 or board 200 as disclosed herein will preferably be classified as "pass".

In North America, one classification system of fire retardant materials is the NFPA 701-2015 Method 2 and comprises a pass/fail classification. Tests performed in the NFPA method comprises char length, afterflame, and dripping. Dripping means that particles/pieces from the specimen sample such as glowing pieces or ashes falls and/or drips from the specimen.

Figure 4:
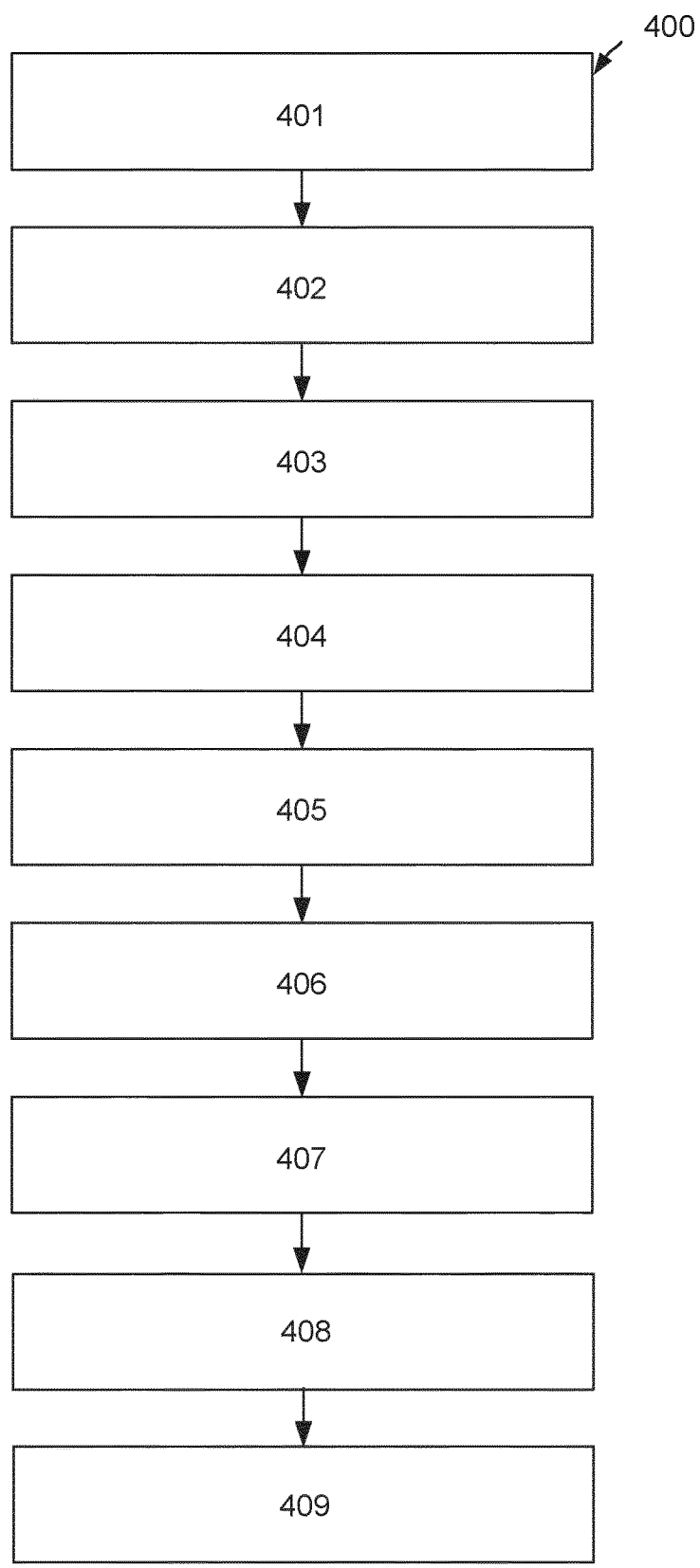
FIG. 4 shows a flow chart illustrating a method of manufacturing a board according to one embodiment.

FIG. 4 shows a flow chart illustrating a method for manufacturing 400 a fire retardant board 200 according to one embodiment of the method. The method will be described in further detail below with reference to FIG. 4.

In a first step, 401, there is provided flute paper which has been pre-impregnated with a flame retardant. The impregnation may have been performed as described above. The flute paper may have been impregnated after its fabrication or, alternatively, flame retardant(s) may have been added to the paper mass during the manufacture of the flute paper, thus giving a pre-impregnated flute paper.

In step 402, a sheet of corrugated flute paper is produced. A first sheet of flute paper is fed in between two corrugating rollers. Heat and steam is applied to shape the first sheet of flute paper into corrugated paper. The temperature of the corrugating rollers is typically 100 to 150° C., such as 115 to 135° C., preferably 120 to 125° C.

In step 403, an adhesive is applied to a flat second sheet of flute paper pre-impregnated with a flame retardant or applied to the corrugated flute paper from step 402. The flute paper of the flat second sheet may have been impregnated after its fabrication or, alternatively, flame retardant(s) may have been added to the paper mass during the manufacture of the flute paper, thus giving a pre-impregnated flute paper.

In step 404, the flat second sheet of flute paper pre-impregnated with a flame retardant is laminated to the first corrugated sheet of flute paper pre-impregnated with a flame retardant. A single-face corrugated board has now been manufactured. A single-face corrugated board comprises a first corrugated piece of flute paper 31 and a second flat piece of flute paper 32 attached thereto (see FIG. 3a). Thus, each single-face corrugated board 30 has a first and a second side, one being a flat surface and the other side being a corrugated surface, defining channels 302 there between each having a longitudinal axis 303. The first side may be the flat surface and the second side may be the corrugated surface. Alternatively, the first side may be the corrugated surface and the second side may be the flat surface.

In step 405, at least one single-face corrugated board is stacked onto a second single-face corrugated board such that a plurality of channels 302, which all have a longitudinal axis 303 in the same direction, are formed in the formed structure 300. See also FIGS. 3b and 3c. The two adjacent single-face corrugated boards are joined by applying an adhesive to a first side of one of the adjacent single-face corrugated boards. The adhesive may be applied to the flat surface and/or to the corrugated surface of one single-face corrugated board. The first side of said one single-face corrugated board faces the second side of the adjacent single-face corrugated board. If more than two pieces are to be joined, the procedure of step 405 is repeated, stacking additional pieces of single-face well on top of the already formed structure 300.

In step 406, the structure 300 is cut into pieces by a cutting machine to provide a core 100 formed from pre-impregnated flute paper by a cutting machine. The cut of the structure intersects the longitudinal axis 303 of the channels 302 of the structure 300 at an angle (b) which is 90 degrees or less than 90 degrees.

In one embodiment, a block of material presenting perpendicular and parallel block faces is cut at a cutting angle (b) relative to one of the block faces, which cutting angle is equal to said angle at which the longitudinal axis is to intersect the first face of the resulting core 100.

Alternatively, the block structure is in the form of parallelepiped, see FIGS. 3d and 3e, presenting two adjacent block faces intersecting at an angle that is equal to the angle at which the longitudinal axis is to intersect the first face of the resulting core 100. Said block of material may thereafter be cut in a direction parallel with one of the block faces to form a core 100 with a tilted wall structure as shown in FIGS. 1b and 2b.

In step 407, the core 100 formed from pre-impregnated flute paper is provided. The core 100 is now formed as a three dimensional body presenting a first face 101 and a second face 105 and a wall structure defining a plurality of channels 102. Each channel has a longitudinal axis 103 intersecting the first face 101 at an angle α which is 90 degrees or less than 90 degrees.

In step 408, an adhesive is applied to the first face 101 of the core 100 and/or to the second face, 105, of the core 100. The adhesive may be a water-based adhesive.

The adhesive may further comprise a flame retardant.

Further, the adhesive may have a solid content of at least 50%.

In one embodiment, the adhesive may be e.g. polyvinyl acetate.

The adhesive may be applied to first 101 and second 105 faces by means of application rollers. This minimizes the consumption of the adhesive. In order to further minimize the consumption, the adhesive may be foamed, i.e. a gas, e.g. air, may be injected in the adhesive whereby the volume is increased.

In step 409, a first liner 210 is laminated to the first face 101 of the board 200 and/or a second liner 210' is laminated to the second face 105 of the core 100. Preferably, the first 210 and the second 210' liners are attached to the first 101 and second 105 faces simultaneously by means of opposite arranged rollers. The first 210 and second 210' liners may also be laminated separately, one at the time. The first and/or second liner may be pre-heated prior to the step of laminating the first and/or second liner onto the first and/or second face of the core. The liners 210, 210' may be impregnated with a flame retardant. The liners 210, 210' may be impregnated before or after being attached to the first or second face of the core, respectively. The liners 210, 210' may be impregnated after their fabrication or, alternatively, flame retardant(s) may be added to the paper mass during the manufacture of the liners 210, 210', thus giving pre-impregnated liners 210, 210'.

The board 200 may thereafter be cut to a desired contour. The board 200 may be cut by means of e.g. a razorblade or an oscillating knife.

Edge liners may be attached to the side portions of the cut core 100, i.e. to the portions of the core that are connecting the first and the second faces of the core. Said side portions may have an extension in a plane which is perpendicular to the first and the second faces of the core 100. The edge liners may be attached to the core 100 using any known adhesive, e.g. a hot melt adhesive or a water based adhesive. The edge liners may be fire retardant.

EXPERIMENTS

Different types of boards were tested to show the fire retardant properties of the board disclosed herein.

The different types of boards tested are disclosed in Table 2. The test boards comprised different combinations of:
- a core wherein the flute paper forming said core has been pre-impregnated with a flame retardant or a core in which the flute paper had not been pre-impregnated with a flame retardant;
- a liner pre-impregnated with a flame retardant or a liner which had not been pre-impregnated with a flame retardant; and
- a liner comprising a flame resistant layer being an aluminium foil or a liner which did not comprise such a layer.

Example 1—NFPA 701 Testing

Several different types of boards were tested using the NFPA 701 test. The flame retardant used for the impregnation of the specimens in the NFPA 701 tests was SITOL FR 226075/37 KT 150+-T2946, which contains a mixture of inorganic compounds comprising sulphur and nitrogen.

Method

The NSPA 701 test may be performed in a folded or flat specimen configuration. The experiments performed herein was performed in the flat configuration, meaning that each specimen is tested unfolded as a flat sheet.

For conducting flame tests of materials in the flat configuration according to Test Method 2 of NFPA 701, at least 10 specimens, each 125×1200 mm are required.

The flame resistance requirements are shown in Table 1.

Prior to testing, the specimens are conditioned at 105° C. for a period of 1 to 3 hours. If specimens melt or are permanently deformed at 105° C. they are conditioned at 20° C.±5° C. for at least 24 hours prior to flame exposure.

Each specimen is removed from the conditioning chamber individually, and immediately suspended in a steel stack, 305 mm square and 2133 mm high. The stack is open at both the top and bottom and is supported 305 mm above the floor. The lower edge of the specimen is positioned 100 mm above the tip of a gas burner which is inclined at 25° vertically.

The burner is adjusted to yield a flame of 280 mm in height and is positioned directly beneath the specimen for a period of 2 minutes. Char length is then measured. Char length is defined as the original length of the specimen minus the distance from the top edge of the specimen to the horizontal line above which all material is intact.

Table 1 below shows the flame resistance requirements for the folded and flat specimen configuration of the NFPA 701 test.

| Specimen Configuration | Maximum Char Length or Destroyed Material Length (mm) | Maximum Afterflame Time (s) | Maximum Duration of Flaiming Drips on Floor of Tester (s) |
|---|---|---|---|
| Folded | 1050 | 2.0 | 2.0 |
| Flat | 435 | 2.0 | 2.0 |

Results 10 specimens for each type of board were used during the test.

The results from the NFPA 701 tests performed on different versions of a board are shown in Table 2 below. Test no. 3-8 were performed using the NFPA 701 test method.

As can be seen, it is clear that the boards having a liner comprising aluminium foil (test no. 6 and 8) pass the NFPA 701 test while those not having a liner comprising an aluminium foil (test no. 5 and 7) do not pass the NFPA 701 test. The reason for failure in tests no. 5 and 7 were "dripping", meaning that particles, such as burning bits and/or ashes, fell down from the specimen as a result of the specimen not keeping intact during the test. This shows that the aluminium foil aids in holding the board together during fire, which prevents dripping of burning particles from the boards.

In addition, the impregnation of the flute paper forming the core also makes the board more fire retardant. As shown by test no. 4 in Table 2, the board is covered with a liner comprising aluminium foil, but the core is not impregnated. This test failed the NFPA 701 test due to that the core caught fire. Thus, a combination of an impregnated core and a liner comprising a layer of aluminium is preferable. When performing the same experiment to test no. 8, where also the flute paper forming the core had been pre-impregnated with a flame retardant, the board passes the NFPA 701 test. Hence, the best result is achieved when the core is impregnated and the liner comprises a layer of aluminium (tests no. 6 and 8). Thus, in order to pass the NFPA 701 test, it is not crucial for the liner to be impregnated with a fire retardant.

Table 2 shows the test results of testing different types of boards. Impregnation was performed using a flame retardant. As shown in Table 2, test no. 3 fails and catches fire. Test no. 3 comprises an impregnated liner, a non-impregnated core and a liner comprising no flame retardant layer.

TABLE 2

| Test no. | Core formed from flute paper | Liner | Flame resistant layer (aluminium) | Result NFPA 701 | Result Euroclass EN 13501-1 |
|---|---|---|---|---|---|
| 1 | Non-impregnated | Non-impregnated | No aluminium foil | — | Fail: catches fire |
| 2 | Non-impregnated | Non-impregnated | Aluminium foil | — | C |
| 3 | Non-impregnated | Impregnated | No aluminium foil | NFPA 701: fail (catches fire, falls apart) | — |
| 4 | Non-impregnated | Impregnated | Aluminium foil | NFPA 701: fail (burns freely, core catches fire) | — |
| 5 | Impregnated | Non-impregnated | No aluminium foil | NFPA 701: falls apart (fail in "dripping") | — |
| 6 | Impregnated | Non-impregnated | Aluminium foil | NFPA 701: Pass | — |
| 7 | Impregnated | Impregnated | No aluminium foil | NFPA 701: falls apart (fail in "dripping") | — |
| 8 | Impregnated | Impregnated | Aluminium foil | NFPA 701: pass | — |

As shown in Table 2, the specimen having an impregnated core and a liner not comprising aluminium falls apart during the NFPA 701 test. However, test no. 4 having a non-impregnated core and a liner comprising aluminium burns freely. This shows that the impregnated core is of importance.

Both test no. 6 and 8 pass the NFPA 701 test. The difference between test no. 6 and 8 is that test no. 6 comprises a board having a non-impregnated liner whereas the board in test no. 8 comprises an impregnated liner. All 10 test of each test no. 6 and 8 passed the criteria of a flat specimen configuration NFPA 701 test. The average length char (mm) for test no. 6 and 8 were 127 mm and 126 mm respectively. The average length of char (mm) is very similar between the two different types of specimens. Hence, the impregnation of the liner with a flame retardant is not the most important factor for improving the flame retarding properties of the boards. The tests show that it is advantageous to incorporate a flame retardant layer, such as aluminium, into the liner. Other possible flame retardant layers may comprise glass fibre, which appears to also have the effect of holding the board together during an outbreak of fire (not shown). The specimen of tests no. 6 and 8 were 16 mm thick.

Example 2—Euroclass Testing (Test No. 1 and 2 in Table 2)

Euroclass testing (EN 13501-1) was performed using two types of tests, namely the ISO 11925 ignitibility test and the EN 13823 single burning item test. These tests are generally conducted in order to obtain a Euroclass in accordance with EN 13501-1.

For test no. 2, specimen of a board comprising a corrugated fibre board core of 15 mm and a liner comprising 80 g/m² paper and a 30 μm thick aluminium foil layer were prepared. The total product had a nominal thickness of 16 mm. The specimen for test no. 1 had the same dimensions and thickness as the specimen for test no. 2, but did not comprise a layer of aluminium foil.

The methods and results are explained in detail below.

Method ISO 11925 Ignitibility Test

This test method determines the ignitability of a material, composite or assembly when subjected to direct impingement of flames. It is not designed to assess any other fire parameters (e.g. flame spread). The possibility of the material, composite or assembly causing secondary ignition of other materials is also considered by the observation of burning droplets or debris, which may be formed.

The specimen is mounted vertically into the test frame and two pieces of filter paper is placed below the specimen. A defined test flame is applied both as an edge flame attack during 30 seconds exposure and as a surface flame attack during 30 seconds of exposure.

Six specimens were tested with each flame application type.

Observations are made as to whether the flame tip reaches a point 150 mm above the original flame application point within the test duration and whether the filter paper placed below the specimen is ignited by any flaming debris/droplets falling from the test specimen.

Method BS EN 13823 Single Item Burning Test

This test provides data on a products heat release, surface spread of flame properties and smoke production when exposed to a thermal attack by a single burning item (SBI) being a sand box burner supplied with propane. The burner is representative of a waste paper basket or small chair fire, and has a heat release rate of 30 kW.

Heat release is a measure of the contribution that a burning material makes to a fire in progress, for example, a high rate of heat release will produce a high rate of temperature increase in surrounding un-burnt material and accelerate fire spread.

The specimen is mounted on a trolley that is positioned beneath an exhaust system. Three separate specimens were tested using this method.

A base line of average heat release is taken from an 'auxiliary' burner over a period of three minutes. Once this baseline is obtained an identical 'primary' burner is ignited, which impinges on the specimen, and is run for a total of 21 minutes.

Heat release and smoke production rates are measured instrumentally throughout the test. This is obtained by air flow drawing the effluent gas through a duct. The smoke density is measured by obscuration of a white light beam and the heat release is measured by gas analysis (oxygen depletion method).

At the end of the test, the heat release from the baseline is deducted from the heat release from the primary burner and the specimen, this then gives the heat release contribution from the tested specimen.

A number of different parameters were calculated from the data obtained:

Visual observations: lateral flame spread (LFS) reaching the end of the long wall of the specimen at a height of between 500 mm and 1000 mm.

Visual observations: release of flaming droplets/particles.

Results

The results from the Euroclass testing (EN 13501-1) are shown in Table 2, test no. 1 and 2. The board in test no. 1 caught fire and thus failed the Euroclass test. The board in test no. 2 passed both the ISO 11925-2 test and the EN 13823 single burning item test. No flaming droplets or particles were observed as falling from the specimens during testing and the flame tip did not reach a point of 150 mm above the original flame application point during the test duration. The test specimens also passed the test of LFS.

This shows that the use of a flame retardant layer, such as aluminium foil, is effective in increasing the fire retardant properties of a board when it is subjected to flames aimed at its surface. The Euroclass tests direct flames onto the surface of the board, and the flame retardant layer creates a barrier between the flames and the core of the board.

During the NFPA 701 tests, the flames come from a source placed below the specimen and the flames are directed at an angle from beneath the specimen. The tests mainly investigate if the specimen is kept intact and/or if lose material falls from the specimen or not. The results from the NFPA 701 tests show that a flame retardant layer, such as aluminium, will cause the board to remain more intact and will prevent dripping.

The tests show that it is advantageous to incorporate a flame retardant layer, such as aluminium, into the liner. Other possible flame retardant layers may comprise glass fibre, which appears to also have the effect of holding the board together during an outbreak of fire (not shown).

The invention claimed is:

1. A fire retardant board comprising
a core formed from flute paper, wherein the flute paper is pre-impregnated with a flame retardant such that the core is fully impregnated with the flame retardant, wherein the core is formed as a three dimensional body presenting a first face and a second face opposed to said first face and a wall structure defining a plurality of channels intersecting the first face at an angle which is 90 degrees or less than 90 degrees;
a first liner attached to said first face; wherein the first liner consists of (i) a first layer adjacent to the core, the first layer being made of cardboard or paperboard, (ii) a flame-resistant layer adhered to the first layer by a first adhesive, and (iii) a surface layer adhered to the flame-resistant layer by a second adhesive, the surface layer comprised of paper; and
a third adhesive arranged to fix the first liner to the first face of the core.

2. The fire retardant board according to claim 1, wherein the flame retardant is:
an inorganic compound comprising sulphur, bromine, chlorine, phosphorous, nitrogen, aluminium and/or magnesium;
an organic compound comprising sulphur, bromine, chlorine, phosphorous, nitrogen, aluminium and/or magnesium;
a metal compound; and/or
a mineral.

3. The fire retardant board according to claim 2, wherein the flame retardant is said inorganic compound, wherein said inorganic compound comprises nitrogen and/or sulphur.

4. The fire retardant board according to claim 1, wherein the angle at which the channels intersect the first face is between 45-85 degrees.

5. The fire retardant board according to claim 1, wherein a second liner is attached to the second face of the core by means of a fourth adhesive.

6. The fire retardant board according to claim 5, wherein the second liner comprises a flame-resistant layer and/or a flame retardant layer.

7. The fire retardant board according to claim 1, wherein the third adhesive is a polymer resin.

8. The fire retardant board according to claim 1, wherein the flame-resistant layer comprises aluminium foil, a flame-resistant polymer adhesive and/or glass fibre.

9. The fire retardant board according to claim 1, wherein the paper of said surface layer is fine print paper.

10. The fire retardant board according to claim 1, wherein the fire retardant board has a Euroclass classification of C or higher.

11. The fire retardant board according to claim 1, wherein said channels each have a longitudinal axis, wherein said angle is less than 90 degrees such that said channels are tilted with respect to said first face.

12. The fire retardant board of claim 1, wherein said flame-resistant layer comprises aluminum foil.

13. A method for manufacturing the fire retardant board of claim 1, the method comprising the steps of:

forming the core from flute paper, wherein the flute paper is pre-impregnated with the flame retardant such that the core is fully impregnated with the flame retardant, wherein the core is formed as the three dimensional body presenting the first face and the second face and the wall structure defining the plurality of channels, each channel having a longitudinal axis intersecting the first face at the angle which is 90 degrees or less than 90 degrees, applying the third adhesive to the first face of the core, and laminating the first liner to the first face of the core; wherein the first liner consists of (i) the first layer adjacent to the core, the first layer being made of cardboard or paperboard, (ii the flame-resistant layer adhered to the first layer by the first adhesive, and (iii) the surface layer adhered to the flame-resistant layer by the second adhesive, wherein the surface layer is paper.

14. The method according to claim 13, wherein the core comprises a plurality of corrugated boards made from flute paper pre-impregnated with the flame retardant, wherein each corrugated board of the plurality of corrugated boards is manufactured by a method comprising the steps of:

corrugating a first sheet of flute paper pre-impregnated with the flame retardant by letting the flute paper pass between two corrugating rolls, applying a fourth adhesive to the corrugated first sheet formed in the previous step or to a second sheet of flute paper pre-impregnated with the flame retardant, and laminating the second sheet of flute paper pre-impregnated with the flame retardant to the corrugated first sheet of flute paper pre-impregnated with the flame retardant.

15. The method according to claim 14, wherein the corrugated boards are single-face corrugated boards.

16. The method according to claim 13, wherein the core is formed from a plurality of corrugated boards made from flute paper pre-impregnated with the flame retardant, wherein each corrugated board of the plurality of corrugated boards has a first side and a second side; and wherein the core is manufactured by a method comprising the steps of:

providing a structure by stacking at least one corrugated board onto a second corrugated board such that the plurality of channels are formed, whereby the longitudinal axis of each channel is in a same direction; wherein two adjacent corrugated boards are adhesively joined such that said first side of a first corrugated board of the two adjacent corrugated boards faces said second side of a second corrugated board of the two adjacent corrugated boards;

cutting the structure such that a cut intersects the longitudinal axis of the channels of the structure at said angle.

17. The method according to claim 16, wherein the corrugated boards are single-face corrugated boards.

18. The method according to claim 13, wherein the flame retardant is
- an inorganic compound comprising sulphur, bromine, chlorine, phosphorous, nitrogen, aluminium and/or magnesium;
- an organic compound comprising sulphur, bromine, chlorine, phosphorous, nitrogen, aluminium and/or magnesium;
- a metal compound; and/or
- a mineral.

19. The method according to claim 13, wherein the angle is between 45 and 85 degrees.

20. The method according to claim 13, further comprising the steps of:

adhesively laminating a second liner to the second face of the core.

21. The method according to claim 20, wherein the second liner comprises a flame-resistant layer and/or a flame retardant layer.

22. The method according to claim 13, wherein the third adhesive is a polymer resin.

23. The method according to claim 13, wherein the flame-resistant layer comprises aluminium foil, a flame-resistant polymer adhesive or glass fibre.

24. The method according to claim 13, wherein said angle is less than 90 degrees such that said channels are tilted with respect to said first face.

25. The method according to claim 13, wherein said flame-resistant layer comprises aluminum foil.

\* \* \* \* \*